Figure 1:
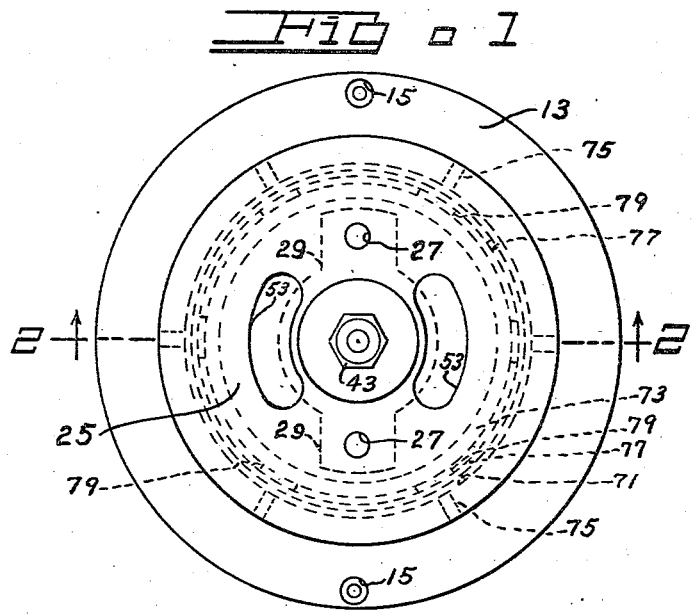

Oct. 8, 1946.                    W. J. BAIRD ET AL                    2,409,096
                                PLASTIC FORMING APPARATUS
                                  Filed Nov. 24, 1944

INVENTOR
William J. Baird
William N. Sparks
BY
F. T. Hicks
ATTORNEY

Patented Oct. 8, 1946

2,409,096

UNITED STATES PATENT OFFICE 2,409,096

PLASTIC FORMING APPARATUS

William J. Baird, Birmingham, and William N. Sparks, Inkster, Mich.

Application November 24, 1944, Serial No. 564,984

3 Claims. (Cl. 25—26)

Our invention pertains to plastic forming apparatus and more particularly to machinery for shaping articles from plastic material for the manufacture of pottery and ceramic ware.

It is an object of our invention to provide improved apparatus for shaping ware and articles from plastic material free from the joint marks and flashes which must be removed by additional operations.

It is a further object of our invention to provide plastic forming apparatus having an improved knock-out and venting arrangement.

It is also an object of our invention an improved spinner for plastic forming and molding apparatus which has an improved light weight and vented construction.

Another object of our invention is to provide plastic forming apparatus having improved trimmer means.

Figure 2:
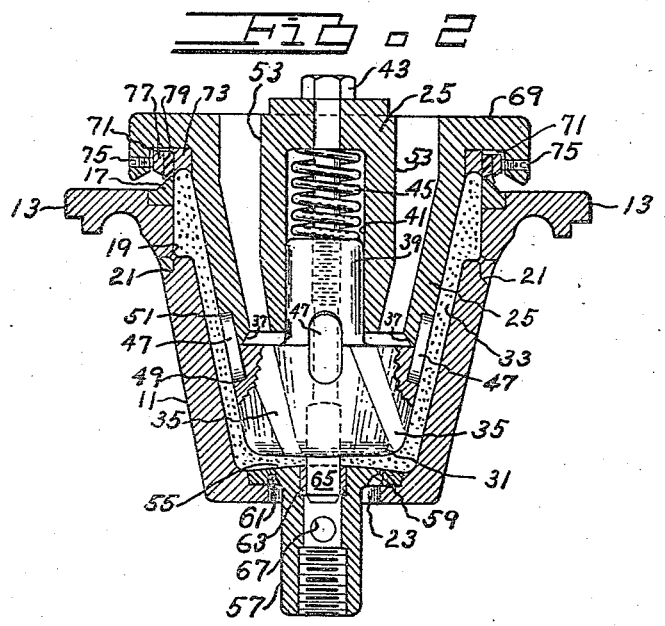

Further objects and advantages are within the scope of the invention, such as relate to the arrangement, operation and function of the related elements of the structure, to various details of construction and to combinations of parts, elements per se, and to economies of manufacture and numerous other features as will be apparent from a consideration of the specification in conjunction with the drawing disclosing specific embodiments of the invention, in which:

Fig. 1 is a plan view of the improved plastic forming apparatus in accordance with our invention; and Fig. 2 is a sectional view on line 2—2 of Fig. 1.

Referring more specifically to the figures of the drawing our improved plastic molding and forming apparatus comprises a stationary mold or die 11 having an internal shape corresponding to the outer conformation of articles, vessels or ware to be manufactured, which for example is in this case represented as a flower pot. Around the upper edge of the mold, a suitably shaped laterally extending flange 13 is provided for mounting and supporting the mold in the plate or table of any automatic or semi-automatic machine (not shown). For mounting attachment to the machine, a pair of holes 15 may be provided in diametrically opposed positions in the flange for reception of suitable screws (not shown) for securing the flange to the table of the machine, in a manner which will be readily understood. The upper edge of the internal opening in the mold 11, is provided with a wear ring 17, of hard steel or any other suitable wear resisting material, having an upstanding surface inclining downwardly to its outer rim, as shown in Fig. 2, and which seats into a suitable annular groove provided in the mold wherein it may be a tight press fit. In the inner wall the mold is provided with a sharply expanding groove 19 for forming the shoulders on flower pots. Opening outwardly through the sidewalls of the mold from this groove 19 vents 21 are provided which release entrapped air and facilitate packing the clay or other plastic material therein. Above this groove 19 the inner surface of the mold rises substantially vertically and below the groove it tapers down and inwardly to a smaller diameter to shape the material to the usual form of a flower pot, as shown. The bottom of the mold turns inwardly so that it is partially closed and forms a central aperture 23 for a purpose to be subsequently described.

For packing and troweling the plastic material into the mold, a spinner 25 is provided having an external shape corresponding to the inner shape of the ware to be formed. The upper surface of the spinner body 25 is provided with a pair of threaded holes 27 in diametrically opposed positions for receiving screws (not shown) for attachment to any adapter 29 of suitable shape, represented dotted in Fig. 1, whereby the spinner may be supported, rotated and moved axially on the rotating spindle of a pottery machine (not shown) whereon it is to be used, in a well known manner.

On the lower end of the spinner body 25 a nose 31 is mounted to be carried in compact assembled relation forming a continuous surface while the plastic material 33 is being worked, and movable to a spaced relation, with air entering through vents provided, to release the ware when the rotating spinner body is lifted from the mold. The outer conformation of the nose 31 corresponds to the shape of the bottom and lower portions of the ware being formed and it is provided with "flats" 35, which are strips or bands of flattened surfaces, for troweling and working the plastic material, as may be seen in Fig. 2, where the nose is seen in side elevation in relation to the other portions of the apparatus shown in cross-section. These flats 35 are also preferably continued on the outer surface of the upper portions of the spinner body 25. The upper end of the nose 31 meets the lower end of the spinner body 25 along a plane which is perpendicular, or at right angles to the geometrical axis, and the axis of rotation, of the spinner. The bottom end of the spinner body 25 is hollowed out except for an outer edge 37 which snugly abuts the nose around the outer edge of the upper end surface. The nose 31 is provided with a neck 39 which rises axially from the center of the upper end of the nose and passes slidably into an aperture 41 extending axially up into the spinner body, for guiding the nose in its movements relative to the spinner body. To limit movement of the nose away from the body, a bolt 43 is threadably secured into the neck 39 and passes up through the top of the spinner body 25 through an aperture of reduced diameter. For urging the nose 31 to move away from the spinner body 25, a compression spring 45 is provided concentrically upon the bolt 43 where it is compressed between the top of the aperture 41 and the upper end of the neck 39.

In accordance with our invention the nose 31 is driven to rotate with the spinner body 25 by means of a driving key or keys 47, a plurality of which are shown in Fig. 2, imbedded in slots in aligned relation between the nose and the body. Each one of the keys 47 extends in one slot 49 in the nose and into another slot 51 in aligned relation in the outer surface of the spinner body so that the outer surface of the key is flush with the outer contiguous surfaces of the nose and the spinner body and so that the key serves also to wipe out the joint mark between the nose and the spinner body. Each key is secured, as by welding or brazing, into one of these slots, preferably in the slot in the nose, and slides freely back and forth in the other slot as the nose moves toward or away from the spinner body. Such a key 47 serves not only to drive the nose, but also serves both to wipe out the joint mark and to maintain more accurate alignment between the nose and the spinner body.

Various portions of the spinner body are cored out providing openings 53 therein, as may be seen in Figs. 1 and 2, making a light weight construction and saving material, while also providing vents from the bottom through the top.

A loose fitting knock-out 55, of substantially a disc shape, is provided substantially smaller than the inside of the bottom of the mold 11 for lifting formed ware from the mold. This knockout is operated through the central aperture 23 in the bottom of the mold by means of a depending stem 57 which is tubular and internally threaded for support upon any suitable member or part of the pottery machine by which it may be operated and lifted up, in a well known manner. The bottom of the mold is provided with a depressed annular groove 59 around the central aperture wherein the knock-out normally rests flush with the bottom of the mold. The diameter of the knock-out being substantially less than the bottom of the mold 11 renders it possible to smoothly round the lower corners of the mold, and the formed ware, as shown. Vents 61 are provided in the knock-out for releasing entrapped air and surplus material through the central aperture 23 in the bottom of the mold, thus entirely eliminating the necessity for providing such vents in the mold. The upper end of the axial aperture in the knock-out is provided with a wear resisting bushing 63 for receiving a punch pin 65 secured in and projecting down from the center of the nose, for forming a hole in the center of each flower pot. The punched material falls down through the aperture in the knock-out, which may be provided with a side aperture 67 for discharging excess material.

For trimming and removing the flash around the upper edges of the flower pot, the upper end of the spinner body is provided with a trimmer flange 69 which projects outwardly and has an annular groove 71 in the under side thereof. A fillet ring 73 is provided in this annular groove adjacent to and around the upper end of the spinner body. A plurality of clamping screws 75 are passed threadably through the outer rim of the flange 69 into the annular groove, at spaced circumferential points, and these screws engage an open clamp strip or ring 77 for clamping strips or pieces 79 of relatively soft or yieldable material such as rubber of synthetic rubber, for example, firmly upon the outer side of the fillet ring 73. Pieces 79 of yieldable material operate as a wiper and rotating upon and around the upper inclining surface of the wear ring 17 of the mold and thereby smoothly trim away any flashes of material from the formed ware. The under side of the fillet ring is provided with a concave annular groove suitable to form a smoothly rounded upper edge on the ware being molded, as may be seen in Fig. 2, and as usual in such apparatus, the spinner body and nose are of circular cross-sections in planes perpendicular to the axis of rotation.

This improved trimmer arrangement is safer to the operator because the overhanging rim of the lateral flange 69 protects his fingers from engaging directly upon the rotating trimmer elements. It also simplifies assembly of the trimmer parts and economizes on maintenance, because the pieces 79 may be conveniently inserted, reversed and replaced as necessitated by wear.

It is apparent that within the scope of our invention modifications and different arrangements and shapes may be provided other than herein disclosed, and the present disclosure is illustrative merely, the invention comprehending variations thereof.

What we claim is:

1. A spinner for rotatable insertion into a mold for shaping plastic material to form smoothly finished ware comprising, a body of substantially circular cross-sections, the upper end of said body being adapted for mounting upon axial rotation means, a nose on the other end of said body, means for slidably supporting said nose on said body for movement toward the body to define a contiguous peripheral surface therewith and for movement away from the body to separate formed wares therefrom, the adjacent portions of said body and nose being formed to meet along a plane at right angles to the axis of rotation, trimming means around the upper end of said body, an elongated driving and wiping key, key receiving slots extending in aligned interconnecting relation in the adjacent peripheral surfaces of said body and nose for receiving said key flush with said surfaces, and one end of said key being secured in one of said slots so that the other end of the key may slide back and forth in the other slot as the nose is moved toward or away from the body.

2. A spinner in accordance with claim 1 and further characterized by having a plurality of said elongated keys sliding back and forth in pairs of aligned slots between said nose and body at circumferentially spaced points therearound, and each of said keys being firmly secured into the corresponding slot in the nose so that it slides in its slot in the body.

3. In combination in plastic forming apparatus, a rotatable spinner of a shape substantially corresponding to the inside of the ware to be formed and adapted to be supported for movement axially for insertion into and withdrawal from a mold to form the inside of the article, said spinner comprising a body, a nose on the end of the body for insertion into a mold, means slidably supporting said nose on said body to move away from the body and separate the formed article as the spinner is removed from a mold, a trimmer flange projecting outwardly around the upper end of said body, an annular groove extending around the upper end of said body in the under side of said flange, a plurality of clamping screws passing threadably through the outer rim of said flange into said annular groove at circumferentially spaced points, a fillet ring in said annular groove adjacent the upper end of said body, an open clamp ring in said groove adjacent the rim of said flange, and yieldable wiper means clamped between said clamp ring and said fillet ring by said clamping screws.

WILLIAM J. BAIRD.
WILLIAM N. SPARKS.